3,024,232
REACTION PRODUCTS OF NITROOLEFINS AND CARBONYL COMPOUNDS

Edward B. Hodge, Terre Haute, Ind., assignor to Commercial Solvents Corporation, Terre Haute, Ind., a corporation of Maryland
No Drawing. Filed Sept. 18, 1958, Ser. No. 761,671
1 Claim. (Cl. 260—244)

My invention relates to the products of the reaction of nitroolefins and carbonyl compounds and more particularly it relates to the products of the reaction of nitroolefins and ketones or aldehydes and to the process of producing the same.

My new reaction products are obtained by the reaction of a nitroolefin having the structural formula

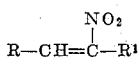

where R is selected from the group consisting of hydrogen, phenyl, furyl, halogen substituted phenyl, and lower alkyl substituted phenyl; and $R^1$ is selected from the group consisting of hydrogen, methyl, ethyl, propyl, and butyl with a carbonyl compound having the structural formula

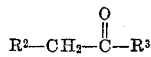

where $R^2$ is selected from the group consisting of alkyl having up to 10 carbon atoms, phenyl, halogen substituted phenyl, lower alkyl substituted phenyl; and $R^3$ is selected from the group consisting of hydrogen and alkyl having up to 10 carbon atoms; and $R^2$ and $R^3$ together may be an alkylene radical having up to 10 carbon atoms in the presence of a base, the mixture of reactants being cooled during the reaction period to dissipate the heat of reaction, and then acidified to obtain the product in the free form rather than in a salt form. The nitroolefins which I employ in my reaction can be substituted or unsubstituted. Among the substituted nitroolefins which I can employ are included 2-nitro-1-methyl-1-propene, 2-nitro-1-phenyl-1-propene, 2-nitro-1-p-chlorophenyl-1-propene, 2-nitro-1-m-bromophenyl-1-propene, 2-nitro-1-p-tolyl-1-propene, 2-nitro-1-(2,4-xylyl)-1-propene, 2-nitro-1-furyl-1-propene, 2-nitro-1-p-ethylphenyl-1-propene, 2-nitro-1-phenyl-butene, etc. Unsubstituted nitroolefins which I can employ include nitroethene, 2-nitro-1-propene, 2-nitro-1-butene, etc. The carbonyl compound which I employ in my reaction with the nitroolefin can be either an aldehyde or a ketone. Suitable carbonyl compounds include acetone, diethyl ketone, cyclohexanone, acetophenone, butyraldehyde, acetaldehyde, valeraldehyde, benzaldehyde, p-chlorobenzaldehyde, p-bromobenzaldehyde, etc. As indicated the reaction is carried out in the presence of a base. Suitable bases include alkali metal and alkaline earth metal hydroxides.

I do not know the exact structure of the product of the reaction of a nitroolefin and a carbonyl compound since there are at least two possible products which could result. Without being limited by any particular theory, it is my belief that the products are either aci-nitrocarbonyl compounds or the hemiacetal of aci-nitrocarbonyl compounds. This belief is strengthened by the fact that infrared studies of my compounds disclose that the strong bands indicating the presence of nitro or ketone radicals are absent in my new compounds. The possible reaction products which could be derived from the interaction of a nitroolefin with a ketone is shown in the following generic equations:

EQUATION I

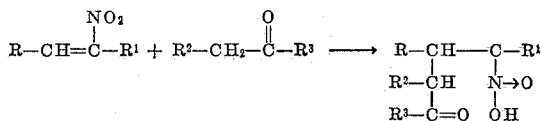

EQUATION II

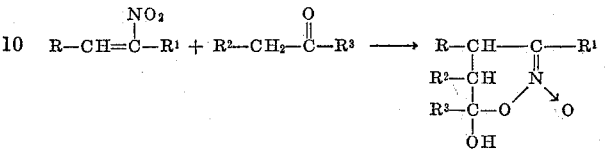

By the process of Equation I the aci-nitrocarbonyl compound is formed and by the process of Equation II the hemiacetal of the aci-nitrocarbonyl compound is formed.

Alkali metal or alkaline earth metal salts are obtained by reaction of a nitroolefin and a carbonyl compound because the reaction is conducted in the presence of a base such as alkali metal or alkaline earth metal hydroxide. The desired nitrocarbonyl compound is obtained by acidification of the salt. Acids which I have found useful for this purpose are acids commonly known as "weak acids." Such acids include acetic acid, propionic acid, boric acid, etc. The nitrocarbonyl compound can be converted to a salt by dissolving it in an aqueous solution of an alkali metal or alkaline earth metal salt by mixing the alkaline solution with ether to precipitate the salt.

The following examples are offered to illustrate my invention; however, I do not intend to be limited to the specific proportions, materials, procedures, etc., described. Rather I intend to include within the scope of my invention all equivalents obvious to those skilled in the art.

Example I

To a solution of 32.6 grams of 2-nitro-1-phenyl-1-propene in 100 ml. of cyclohexanone was added a solution of 8 grams of sodium hydroxide in 12 ml. of water. On stirring the mixture, a temperature rise occurred and the temperature was held at about 40° C. by intermittent cooling. After about 30 minutes, the reaction mixture was one phase and was thereupon allowed to cool to room temperature after which it was poured with stirring into 400 ml. of 10% acetic acid. An oil formed which soon crystallized, the crystals being then filtered and washed with acetone to give 24 grams of white crystals having no definite melting point but decomposing at 136–138° C. Analysis: Nitrogen, calculated (for 1-phenyl-1-(2-oxo-cyclohexyl)-2-aci-nitro-propane and corresponding hemiacetal)=5.36%, found=5.22%; carbon, calculated= 68.94%, found=69.10%; hydrogen, calculated=7.35%, Found 7.49%. The product was slightly soluble in acetone, methanol, ethyl acetate, nitromethane, and acetic acid. The product was dissolved in 5% sodium hydroxide from which it was then precipitated by mixing with ether to obtain the sodium salt of the reaction product.

Example II

An 81-gram portion of 2-nitro-1-phenyl-1-propene was mixed with 25 ml. of butyraldehyde and to the mixture was then added a solution of 2-grams of sodium hydroxide in 5 ml. of mater. The resulting mixture was stirred and when a temperature rise occurred, the temperature was held at about 40–45° C. by intermittent cooling. Upon completion of the reaction, a thick yellow oil was obtained as the product.

Example III

A 17.7-gram portion of 2-nitro-1-p-tolyl-1-propene was mixed with 60 ml. of cyclohexanone and to the resulting mixture was added a solution of 4 grams of sodium hydroxide in 8.0 ml. of water. The resulting mixture was stirred, the temperature being held at about 40–45° C. by intermittent cooling. The reaction ceased after about 30 minutes at which time the reaction mixture was cooled to 20° C. and poured with stirring into 200 ml. of 10% acetic acid. An organic layer separated which crystallized after a few minutes. This was filtered and washed with acetone to obtain 18.3 grams of a solid white crystalline product. Analysis: Nitrogen=4.78%.

*Example IV*

A 15.3-gram portion of 2-nitro-1-(2-furyl)-1- propene was mixed with 40 mil. of cyclohexanone and to the resulting mixture a solution of 4 grams of sodium hydroxide in 6 ml. of water was added. The resulting mixture was stirred for 20 minutes with cooling to maintain a temperature of about 40–45° C. after which the reaction mixture was poured into 200 ml. of 10% acetic acid. The acetic acid mixture was stirred for about 30 minutes, filtered, and the precipitate washed with acetone to obtain 8 grams of product.

*Example V*

A 20-gram portion of 2-nitro-1-phenyl-1-propene was mixed with 100 ml. of acetone and to the mixture was added a solution of 4 grams of sodium hydroxide in 7 ml. of water. The resulting mixture was stirred and intermittently cooled to maintain a temperature of about 40–45° C. Upon completion of the reaction, the mixture was cooled to 20° C. and poured into 200 ml. of 10% acetic acid. A soft white solid product precipitated which was thereupon removed by filtration.

My new compounds are useful as intermediates in the formation of insecticidal materials. For example, the bromine derivatives of my new reaction products have been found effective against pea aphids. The following example is offered to illustrate the preparation of bromine derivatives of my new compositions.

*Example VI*

To 75 ml. of methanol was added a solution of 1 g. of sodium hydroxide in 5 ml. water. To this solution was added 7.5 g. of the reaction product of 2-nitro-1-p-chlorophenyl-1-propene and cyclohexanone and after almost complete solution, the mixture was filtered. A solution of 1.4 ml. of bromine in 25 ml. of methanol was then added dropwise with stirring at 10° C. until 20 ml. had been added and a yellow color obtained. A 5 ml. portion of water was then added and the mixture cooled to crystallize the product. The product was filtered, washed with 25 ml. of methanol and 5 ml. of water to give 3.9 g. of product. The product was recrystallized from cyclohexane to give 1.9 g. having a melting point of 114–115° C. Analysis: Calculated, N=3.74%, Br=21.65%, Cl=9.46%, found, N=3.65% Br=21.39%, Cl=9.50%.

The bromine derivative of the reaction product of 2-nitro-1-p-chlorophenyl-1-propene and cyclohexanone obtained as described in Example VI gave a 90% kill of pea aphids at a concentration of 1% as an emulsified solution in water.

This application is a continuation-in-part of my co-pending application Serial No. 547,049, now abandoned, filed November 15, 1955.

Now having described my invention what I claim is:

As a composition of matter, a compound produced by a process which consists essentially of reacting a nitro-olefin having the formula:

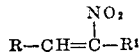

where R is selected from the group consisting of phenyl, monohalo-substituted phenyl, monoalkyl-substituted phenyl, dialkyl-substituted phenyl, and lower alkyl and R$^1$ is selected from the group consisting of hydrogen and lower alkyl with a carbonyl compound having the formula:

where R$^2$ is selected from the group consisting of lower alkyl, phenyl, and monohalo-substituted phenyl and R$^3$ is selected from the group consisting of lower alkyl and hydrogen in the presence of a base to form a reaction mixture, cooling and acidifying the reaction mixture and recovering the thus produced compound.

References Cited in the file of this patent

UNITED STATES PATENTS 2,343,256     Hass _____ Mar. 7, 1944

UNITED STATES PATENT OFFICE
CERTIFICATE OF CORRECTION

Patent No. 3,024,232                                    March 6, 1962

Edward B. Hodge

It is hereby certified that error appears in the above numbered patent requiring correction and that the said Letters Patent should read as corrected below.

Column 2, line 64, for "mater" read -- water --; column 3, line 14, for "40 mil." read -- 40 ml. --.

Signed and sealed this 28th day of August 1962.

(SEAL)
Attest:

ESTON G. JOHNSON
Attesting Officer

DAVID L. LADD
Commissioner of Patents